United States Patent
Pedersen

(10) Patent No.: US 9,722,778 B1
(45) Date of Patent: Aug. 1, 2017

(54) SECURITY VARIABLE SCRAMBLING

(71) Applicant: Altera Corporation, San Jose, CA (US)

(72) Inventor: Bruce B. Pedersen, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 15/219,103

(22) Filed: Jul. 25, 2016

Related U.S. Application Data

(62) Division of application No. 14/025,697, filed on Sep. 12, 2013, now Pat. No. 9,425,959.

(60) Provisional application No. 61/744,879, filed on Oct. 3, 2012, provisional application No. 61/744,825, filed on Oct. 3, 2012.

(51) Int. Cl.
*H04L 9/06* (2006.01)
*H04L 9/28* (2006.01)

(52) U.S. Cl.
CPC ........ *H04L 9/0618* (2013.01); *H04L 2209/08* (2013.01)

(58) Field of Classification Search
CPC ......... H04L 9/003; H04L 9/06; H04L 9/0612; H04L 9/0618; H04L 9/0631; H04L 9/0637; H04L 9/14; H04L 9/28; H04L 2209/08
See application file for complete search history.

(56) References Cited

U.S. PATENT DOCUMENTS

| | | | | |
|---|---|---|---|---|
| 6,249,582 B1* | 6/2001 | Gilley | ....................... | H04L 9/12 380/262 |
| 2005/0201554 A1* | 9/2005 | Kramer | ................. | H04L 9/0637 380/28 |
| 2007/0286416 A1* | 12/2007 | Bertoni | ................. | H04L 9/0631 380/37 |
| 2008/0025509 A1* | 1/2008 | Van De Ven | ......... | H04L 9/0637 380/210 |
| 2009/0323927 A1* | 12/2009 | Schneider | ............. | H04L 9/0637 380/28 |
| 2010/0150344 A1* | 6/2010 | Karroumi | ............. | H04L 9/0637 380/45 |
| 2010/0246809 A1* | 9/2010 | Noda | .................... | H04L 9/0637 380/28 |

OTHER PUBLICATIONS

Schneier, Applied Cryptography, 1996, John Wiley & Sons, pp. 351-354.*

* cited by examiner

*Primary Examiner* — Minh Dinh
(74) *Attorney, Agent, or Firm* — Fletcher Yoder, P.C.

(57) ABSTRACT

Methods and systems are provided for securing an integrated circuit device against various security attacks, such as side-channel attacks. By limiting the number of different challenge vectors that can be combined with a critical variable of an encryption operation, it becomes more difficult to create enough side channel measurements to successfully perform statistical side-channel analysis.

16 Claims, 5 Drawing Sheets

SECURITY VARIABLE SCRAMBLING

CROSS-REFERENCE

This is a divisional of U.S. application Ser. No. 14/025,697, filed Sep. 12, 2013, the contents of which is incorporated by reference in its entirety, which claims the benefit of U.S. Provisional Application Nos. 61/744,825 and 61/744,879, both filed Oct. 3, 2012, the contents of which are incorporated by reference in their entirety.

STATEMENT REGARDING FEDERALLY SPONSORED RESEARCH OR DEVELOPMENT

This invention was made with government support under contract number N41756-11-C-4004 awarded by the Navy Engineering Logistics Office. The government may have certain rights in the invention.

FIELD OF THE INVENTION

This invention relates to methods and systems for securing an integrated device against security attacks.

BACKGROUND OF THE INVENTION

Programmable devices are well known. In one class of known PLDs, each device has a large number of logic gates, and a user programs the device to assume a particular configuration of those logic gates, typically by receiving configuration data from a configuration device. Configuration data has become increasingly complex in modern PLDs. As such, proprietary configuration data for various commonly-used functions (frequently referred to as "intellectual property cores") have been sold either by device manufacturers or third parties, freeing the original customer from having to program those functions on its own. If a party provides such proprietary configuration data, it may want to protect this data from being read, as well as any internal data that may reveal the configuration data.

Commonly-assigned U.S. Pat. Nos. 5,768,372, and 5,915,017, each of which is hereby incorporated by reference herein in its respective entirety, describe the encryption of the configuration data and its decryption upon loading into the programmable device, including provision of an indicator to signal to the decryption circuit which of several possible encryption/decryption schemes was used to encrypt the configuration data and therefore should be used to decrypt the configuration data. Commonly-assigned U.S. Pat. No. 7,479,798, which is hereby incorporated by reference herein in its entirety, describes a disabling element that can be used to selectively disable a reading of a data from a device.

Cryptographic algorithms may provide one or more classes of encryption/decryption schemes for securing the configuration data. Encryption is often implemented with a block cipher, e.g., the Advanced Encryption Standard (AES), in which a configuration bitstream is portioned into fixed-sized ciphertext blocks (typically 128-bits), and each block is decrypted with a decryption key. The internal implementation of a block cipher is typically divided into multiple "rounds" per ciphertext block, where every round uses an "expanded" round-key that is derived from the encryption key (AES-256 uses 14 rounds per ciphertext block). Depending on the Mode of Operation, there may also be an Initialization Vector (IV) that is associated with the bitstream. To ensure the confidentiality of the bitstream, the encryption/decryption key is kept secret, and the IV is not reused for encrypting different bitstreams.

The key for decrypting the bitstream is usually stored in the PLD, and generally cannot be read externally of the PLD. However, by using various side-channel analysis (SCA) techniques, an attacker may still be able to determine the value of the internal decryption key. This may be done by applying statistical analysis techniques to side-channel information emitted from the PLD, such as power-supply fluctuations or electromagnetic emanations. Whatever the source of the side-channel information, the resulting sidechannel measurement may be used to mount SCA attacks. Such SCA attacks may be done actively (by repeatedly modifying the ciphertext or associated IV), or passively (by observing the side-channel information emitted during the encryption of an unmodified bitstream). These SCA attacks may directly target the key used for encryption, or may target other critical variables that are kept secret to ensure confidentiality (e.g., expanded round keys or intermediate states of the encryption engine). SCA attacks usually leverage the fact that the value of the critical variable being attacked is logically combined multiple times with different values, herein referred to as "challenge vectors." For example, the NIST Counter mode of encryption algorithm may logically XOR a critical variable (e.g., the encryption key) with many different challenge vectors (e.g., the counter). Alternatively, in some cases, an attacker can directly manipulate the challenge vector, such as when the challenge vector is an IV that the attacker can modify. While the logical combination function is often the XOR operation, any other linear or non-linear logical combination function may also be susceptible to an SCA attack.

Numerous techniques exist in the public literature that describe attempts to prevent SCA attacks against encryption keys. The effectiveness of these techniques is however limited in practice. Some of these techniques attempt to thwart SCA attacks by minimizing the magnitude of the sidechannel signal. This might be done by implementing the encryption logic using dual-rail logic, or by isolating the power-supply (such as by using capacitors and filters). Other techniques attempt to obscure the side-channel information by adding random noise to the system (such as by adding explicit noise-generators to the circuitry). Other techniques attempt to randomize the side-channel signal algorithmically based on a randomly generated masking value. Examples of such techniques are described in the following articles: "Overview of Dual Rail with Precharge Logic Styles", Danger, J.-L., $3^{rd}$ International Conference on Signals, Circuits and Systems (SCS), 2009; "Correlated Power Noise Generator as a Low Cost DPA Countermeasures to Secure Hardware AES Cipher", Kamoun, N., 3rd International Conference on Signals, Circuits and Systems (SCS), 2009; and "On Boolean and Arithmetic Masking against Differential Power Analysis", Jean-Sébastien Coron, Louis Goubin, Proceedings of the Second International Workshop on Cryptographic Hardware and Embedded Systems, p. 231-237, Aug. 17-18, 2000.

SUMMARY OF THE INVENTION

The present invention relates to systems and methods for protecting an integrated circuit against, and in particular preventing side-channel attacks against programmable logic device bitstream encryption.

According to some embodiments, systems and methods for processing data based on a cryptographic operation are provided. A secret value of a critical variable is scrambled with a first element of a challenge vector, to generate a first scrambled value of the critical variable, where the critical variable is used in the cryptographic operation. The first scrambled value of the critical variable is scrambled with a second element of the challenge vector to generate a second scrambled value of the critical variable. The data is encrypted based on the second scrambled value of the critical variable.

According to some embodiments, systems and methods for processing a first and second data blocks based on a cryptographic operation are provided. The first data block is decrypted based on a first value of a critical variable used in the cryptographic operation. After decrypting the first data block, the first value of the critical variable is scrambled based on a first element of a hash vector to generate a first scrambled value of the critical variable. The second data block is scrambled based on the scrambled value of the critical variable.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Figure 1:
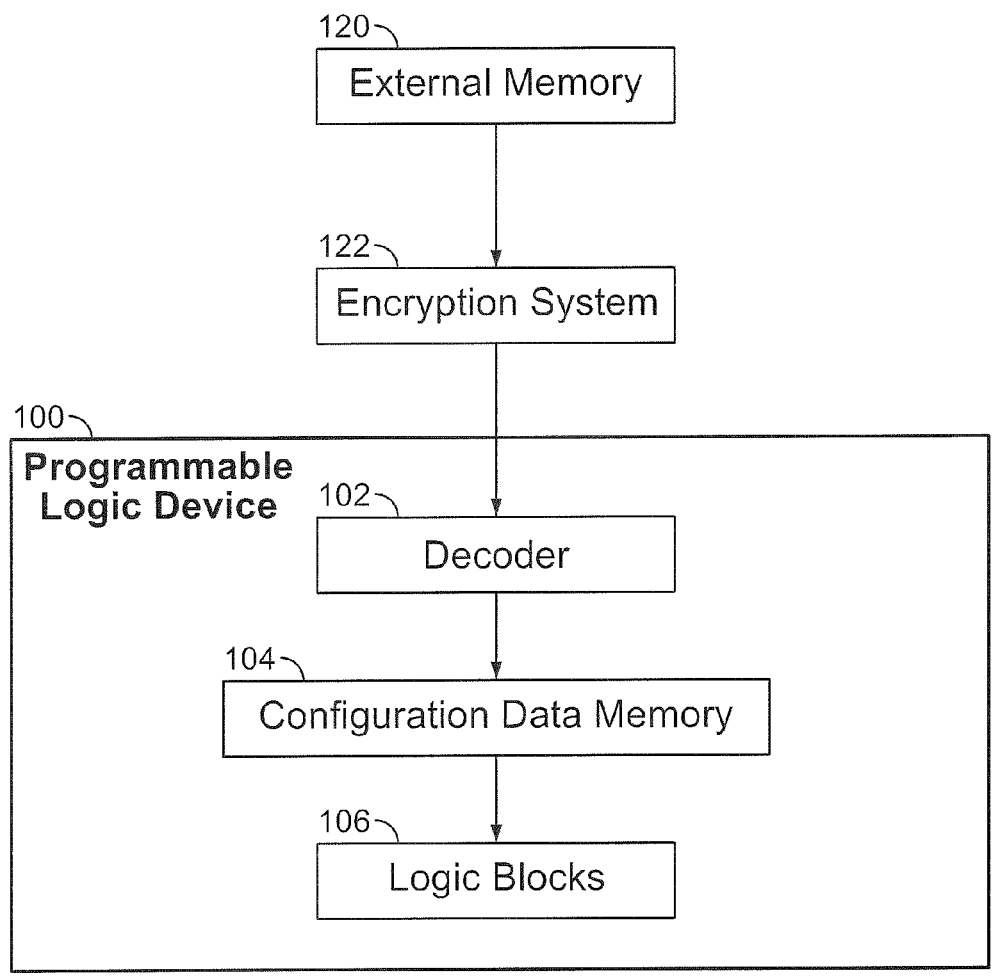
FIG. 1 shows an exemplary block diagram of a programmable logic device as an example of an integrated circuit device in which embodiments of the present invention may be implemented.

FIG. 1 shows an exemplary block diagram of a programmable logic device 100 as an example of an integrated circuit device in which embodiments of the present invention may be implemented. The external memory 120 contains configuration data, typically including proprietary designs, that is used to configure the functionality of the logic device 100. The configuration of logic device 100 may occur upon powering up the device, rebooting, or at some other reprogramming time. For example, upon powering up, the configuration data may be sent from the external memory 120 to the logic device 100. The configuration data may be encrypted in order to prevent copying when the data is in transit, e.g., using an encryption system 122. Although encryption system 122 is shown as external to PLD 100, encryption system 122 may be internal to PLD 100.

The encrypted data is sent to the logic device 100 where it is decrypted by a decoder 102. The decrypted data is then stored in configuration data memory 104. The configuration data is used to configure the functionality of logic blocks 106. After configuration, the logic blocks may start operating on input data. When in operation, the logic blocks may store internal data, e.g., in data registers, RAM, or other suitable storage. This internal data may reflect specific aspects of the configuration data. Additionally, in non-programmable devices, the internal data may reflect proprietary aspects of the circuit design that the designer may desire to keep secret.

In some embodiments, the configuration data (which will be referred to herein as plaintext) may be encrypted using an encryption cryptographic system that implements a cryptographic algorithm, similar to encryption system 122. The decoder 102 may then decrypt the encrypted data (i.e., ciphertext) using a corresponding decryption cryptographic system that implements the cryptographic algorithm.

One common cryptographic algorithm is a symmetric key block cipher algorithm adopted by the Department of Commerce, National Institute of Standards and Technology (NIST) as its Advanced Encryption Standard (AES). (See detailed specification in "Federal Information Processing Standards Publication 197" (FIPS 197), of Nov. 26, 2001.) The AES algorithm uses cryptographic keys of 128, 192 and 256 bits to encrypt and decrypt data in blocks of 128 bits. The algorithm iterates a number of nearly identical rounds depending on key length and block size. AES128 uses 10 rounds, AES192 uses 12 rounds and AES256 uses 14 rounds to complete an encryption or decryption operation.

Although the remainder of this specification will mainly discuss the AES embodiment, it should be understood that embodiments of the invention described herein are applicable to other key lengths and block sizes as well as to other cryptographic algorithms and modes of operation. As such, discussing the embodiments with respect to AES cryptographic algorithm is meant for the purposes of illustration not limitation.

A cryptographic algorithm may be associated with one or more critical variables. Examples of a critical variable include, but are not limited to, encryption keys, expanded round keys, and/or intermediate states of the encryption engine such as internal AES states. A critical variable must in general be kept secret to ensure confidentiality of the data being encrypted.

A cryptographic algorithm may also be associated with a challenge vector, with which the value of the one or more critical variables are combined. Examples of a challenge vector include, but are not limited to, internal counters and/or initialization vector (IV) values. A challenge vector may be modified by a user, or it may be internal to the cryptographic algorithm. Some attacks leverage the fact that the value of a critical variable in the cryptographic algorithm may be logically combined multiple times with different challenge vectors, for the purpose of obtaining a number of side channel measurements.

Some embodiments described herein limit the number of different challenge vectors that can be combined with the value of a critical variable of a cryptographic algorithm. For example, some embodiments may prevent the critical variable from being challenged by more than two different challenge vectors. This technique may hinder attacks that obtain multiple side channel measurements from combining the value of a hidden variable with multiple different challenge vectors. By limiting the number of different challenge vectors with which a critical variable can be challenged, it becomes more difficult (and even impossible) to create enough measurements to perform a successful statistical SCA analysis.

Embodiments described herein may protect against multiple types of security attacks. For example, systems and methods described herein may protect against active SCA attacks where an attacker is able to manipulate challenge vectors (e.g., an IV that is input by the user). Systems and methods described herein may protect against passive SCA attacks where an attacker is not able to directly manipulate challenge vectors (e.g., an internal counter value used in the cryptographic algorithm).

Figure 2:
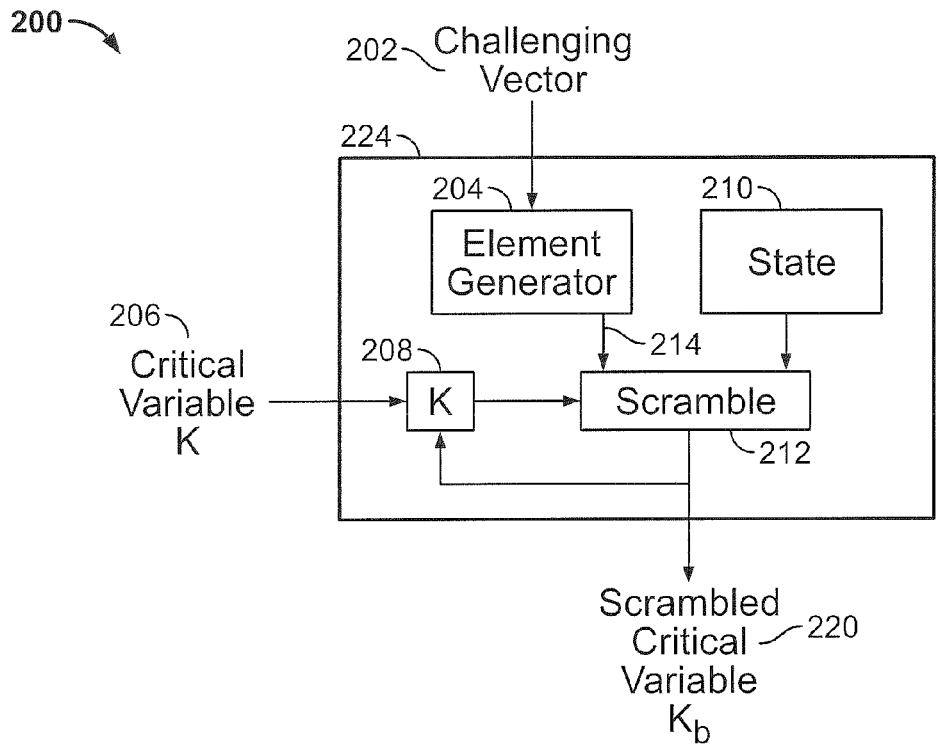
FIG. 2 is an exemplary block diagram representing scrambling circuitry according to some embodiments.

FIG. 2 is an exemplary block diagram representing scrambling circuitry 200 according to some embodiments. The scrambling circuitry 200 may be used to protect against an active SCA attack. Scrambling circuitry 200 may be a component of encryption circuitry such as encryption system 122 of FIG. 1 for encrypting configuration information.

A challenge vector 202 may be input into scrambling block 224 of the scrambling circuitry 200. This challenge vector 202 may correspond to an input vector over which the user/attacker has control. For example, challenge vector 202 may be an initialization vector (IV) input by the user/attacker. Scrambling block 224 may use the challenge vector 202 element-by-element (e.g., one-bit-at-a-time) to scramble a critical variable 208. In the illustrative example of FIG. 2, the critical variable 208 is a secret encryption key K used in a cryptographic algorithm such as AES. This example is meant for the purposes of illustration, not limitation and the critical variable 208 may be any other variable of the cryptographic algorithm.

An element generator 204 of the scrambling block 224 may provide an element b (labeled 214) of the challenging vector 202. Element generator 204 may or may not include memory components to store challenge vector 202. The value of the critical variable 208 may be combined with the provided element b using scrambling function block 212. Scrambling function block 212 may take as inputs variables corresponding to the state of the encryption engine, represented by block cipher state 210. The scrambling function block may implement any suitable operation, such as a linear or non-linear scrambling function to scramble the critical variable 208 based on the provided challenge vector element b and/or the state S.

Figure 3:
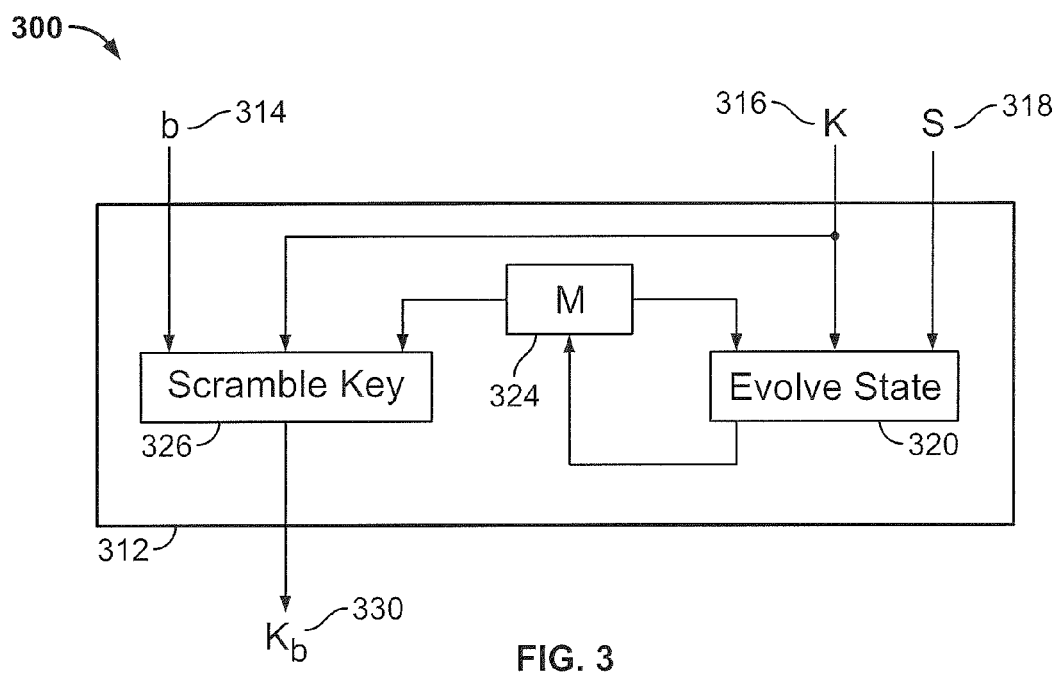
FIG. 3 is an exemplary block diagram representing a scrambling function block implementation according to some embodiments.

One exemplary scrambling function block 212 is illustrated in FIG. 3. FIG. 3 is an exemplary block diagram representing a scrambling function block implementation 300 according to some embodiments. Exemplary implementation 300 takes as inputs a challenge vector element 314, critical variable 316, and block cipher state 318. Challenge vector element 314 may be similar to element b (labeled 214) of FIG. 2. Critical variable 316 may be similar to critical variable 208 of FIG. 2. Block cipher state 318 may be similar to state 210 of FIG. 2.

Implementation 300 uses the value of element b to conditionally XOR the critical variable 316 with a hidden mask variable M (labeled 324) in ScrambleKey block 326. A scrambled value Kb (labeled 330) is generated. The hidden mask variable 324 may be updated using an EvolveState block 320. For example, the hidden variable 324 may be updated based on a function of prior scrambled values of the critical variable 316. In one example, the mask variable 324 is computed as a function of prior scrambled keys by making the mask variable 324 a combination of one or more internal AES rounds 318, where one or more of the rounds uses one or more of the prior scrambled critical variables as round keys.

The following table illustrates one exemplary scrambling function that may be implemented using scrambling operation block 224 and/or scrambling function block implementation 300.

Figure 4:
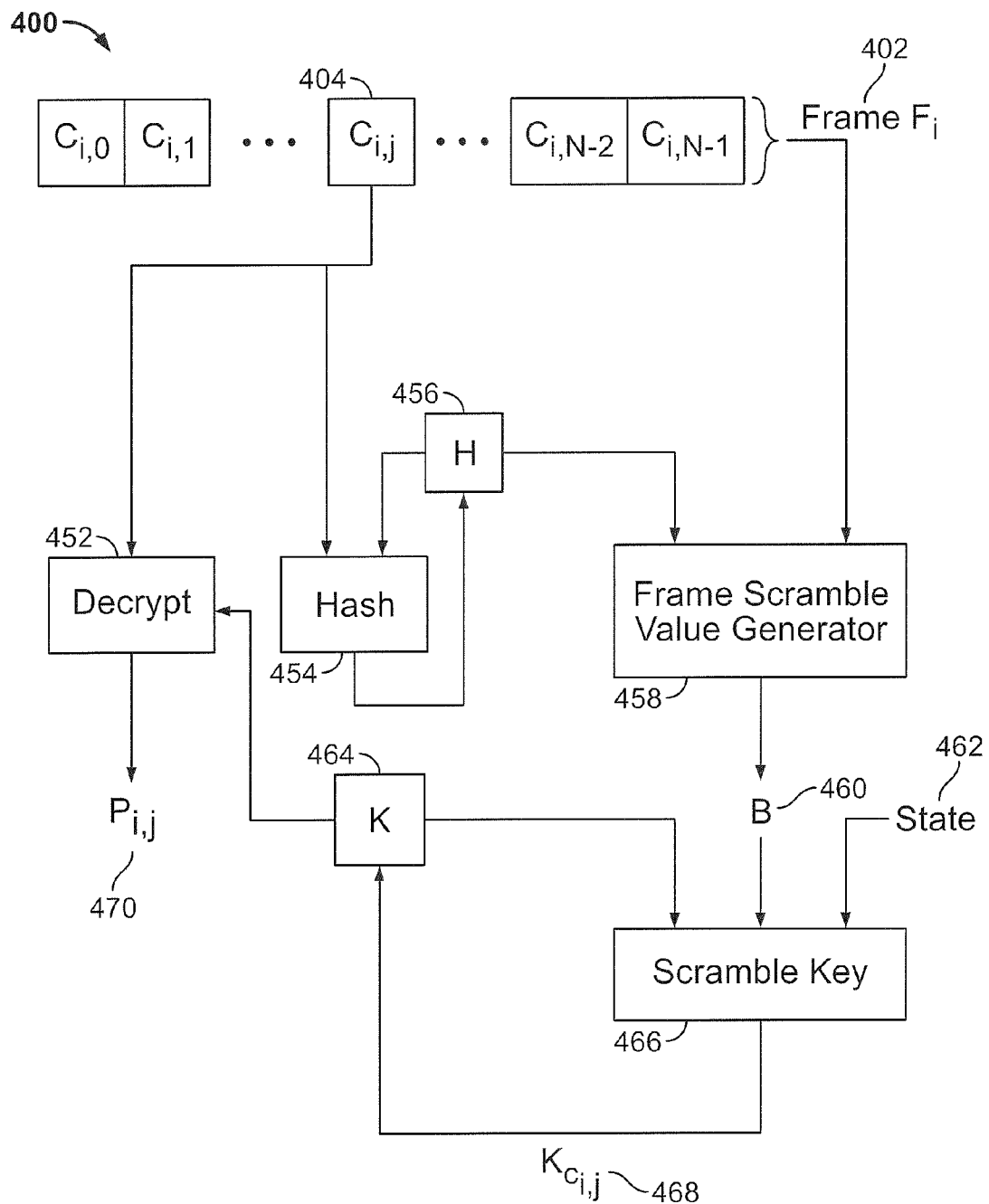
FIG. 4 is an exemplary block diagram representing an inter-block scrambling operation according to some embodiments.

V: Challenge Vector
K: Critical Variable
S: Internal Block Cipher State
M: Mask value
// Scrambling the critical variable one-element-at-a-time:
For each element b of the challenge vector V:
M=EvolveState(K, S, M)
K=ScrambleKey(b, K, M);
// Example EvolveState( ) function
M=M xor S
// Example ScrambleKey( ) function:
If b
K=K xor M FIG. 4 is an exemplary block diagram 400 representing an inter-block scrambling operation according to some embodiments. This operation may be used to protect against passive attacks, by scrambling the value of a critical variable between decryption operations of ciphertext blocks. The inter-block scrambling operation may be performed by evolving a critical variable such as an encryption key with a scrambling function. For example, the encryption key may be scrambled by combining its value (e.g., XORing the value of the encryption key) with the value of a hidden mask variable that is evolved with a scrambling function. The scrambling function may be implemented similarly to the scrambling functions described above.

In some embodiments, ciphertext blocks may be defined into one or more frames with N ciphertext blocks per frame. FIG. 4 shows one such frame Fi (labeled 402) with N ciphertext blocks labeled blocks $C_{i,0}$ through $C_{i,N-1}$. The scrambling operation may scramble a critical variable, such as an encryption key K, between ciphertext blocks $C_{i,j}$. The scrambling operation may be performed on the critical variable in a one-element-at-a-time fashion similar to the operations described above. For example, the critical variable may be scrambled based on elements of an N-bit hash, one bit at a time. This N-bit hash may be derived from one or more previous ciphertext frames $F_0, F_1, \ldots, F_{i-1}$. In this way, modifying a bit in a ciphertext block $C_{i,j}$ may result in scrambling critical variables used to decrypt the ciphertext blocks in subsequent frames $F_{i+1}, F_{i+2}$, etc.

One inter-block scrambling implementation 400 is shown in FIG. 4. A ciphertext block $C_{i,j}$ (labeled 404) may be decrypted using decryption block 452 to generate plaintext block $P_{i,j}$ (labeled 470). Decryption block 452 may use a critical variable K (such as an encryption key) from critical variable block 464. Critical variable block 464 may have an associated memory and/or memory element, which may be a single memory device, a plurality of memory devices, and/or embedded circuitry of the processing module, for storing the current value of the critical variable.

Ciphertext block $C_{i,j}$ may also be input into hash function block 454 to compute a hash value H represented by hash value block 456. Hash function block 454 may implement any of a variety of particular functions to generate a hash or index value. For example, in one embodiment, hash function block 454 may perform an XOR function on one portion of the ciphertext block and one portion of the hash value. Hash value block 456 may be implemented similarly to encryption key block 464.

A frame scramble value generator 458 may scramble frame Fi based on hash value H to generate scrambled vector B. The critical variable K, the scrambled vector B, and state 462 may be input into scramble key block 466 to compute a scrambled value of the critical variable, $K_{c_{i,j}}$ (labeled 468). State 462 may be an internal block cipher state, similar to state 210 of FIG. 2. The value of the critical variable may then be updated with the scrambled value, i.e., the value is updated to $K_{c_{i,j}}$.

The following table illustrates one exemplary scrambling function that may be implemented using scrambling function block implementation 400 after each ciphertext block Ci,j.
V: Challenge Vector
K: Critical Variable
C: Ciphertext block
P: Plaintext block
S: Internal block cipher state
M: Mask value
B: A vector of scramble bits
H: A cryptographic hash value
// Scrambling the critical variable after each ciphertext block:
For each frame F, of N ciphertext blocks:
  B[N-1:0]=H[N-1:0];
  For each Ciphertext block Ci,j in frame Fi
    H=Hash(H, C);
    Pi,j=Decrypt(K, Ci,j);
    M=EvolveState(K, S, M);
    K=ScrambleKey(B[i], K, M);

Embodiments described above may limit the number of challenge vectors per critical variable (and thus the number of measurements that can be acquired by an attacker to mount a successful SCA against the critical variable) by using techniques based on key-evolution and one-element-at-a-time key scrambling. In some examples, no hidden critical variable can ever be combined with more than two different challenge vectors. This can effectively mitigate passive and/or active SCA attacks.

Figure 5:
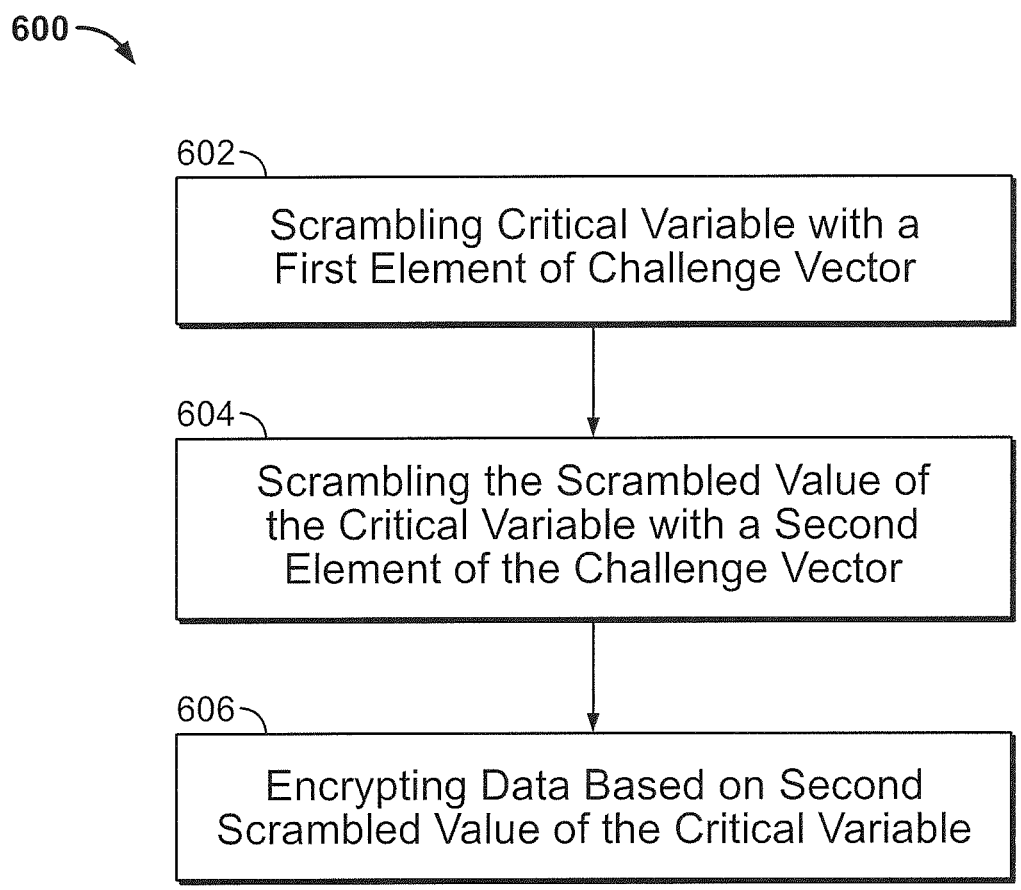
FIG. 5 shows an exemplary flowchart of a process for processing data according to some embodiments.

FIG. 5 shows an exemplary flowchart of a process 600 for processing data according to some embodiments. Process 600 may be implemented in encryption/decryption circuitry similar to encryption system 122 and decoder 102 of FIG. 1. Process 600 may be performed in a programmable logic device such an FPGA and/or PLD, for encrypting/decrypting data comprising configuration bitstream. Process 600 may also be implemented in any integrated circuit including ASSP, an ASIC, a full-custom chip, and/or a dedicated chip.

At 602, a secret value of a critical variable is scrambled with a first element of a challenge vector. The critical variable may be an encryption key, an intermediate state, or any private information associated with the cryptographic operation. The scrambling operation at 602 generates a first scrambled value of the critical variable. Scrambling the secret value of the critical variable may limit the number of different challenge vectors with which the secret value of the critical variable can be combined.

Challenge vectors may have different kinds, for example, based on how much control an attacker has on the challenge vectors.

A challenge vector may be under full control of an external user. A challenge vector of this first kind may be an input directly provided by the user to the cryptographic operation, such as an initialization vector (IV).

Alternatively, an external user may have less control over a challenge vector, e.g., such that the challenge vector may not be directly set or modifiable by the external user. A challenge vector of this second kind may correspond to internal values of the cryptographic operation, such as hidden values stored in registers inside of the integrated circuit. Examples of a challenge vector of this kind include an internal counter, a mask value such as the "M" mask value of FIGS. 2 and 3, an internal state value such as the "S" state value of FIGS. 2 and 3, and/or any suitable variable related to the cryptographic operation that is not directly controlled by the user.

At 604, the first scrambled value of the critical variable is scrambled with a second element of the challenge vector to generate a second scrambled value of the critical variable. This may be done by conditionally combining (e.g., XOR-ing) the first scrambled value of the critical variable with a hidden mask variable. The value of the hidden mask variable may itself be a function of a prior scrambled value of the critical variable. For example, the value of the hidden mask variable may be a combination over one or more internal encryption rounds, where one of the one or more internal encryption rounds uses the prior scrambled value of the critical variable.

At 606, data is encrypted/decrypted based on the second scrambled value of the critical variable. For example, plaintext data may be encrypted to generate ciphertext and, conversely, ciphertext data may be decrypted to generate plaintext. As used herein, encryption and decryption refer to processing data using appropriate operations to convert between different forms of data. For example, decryption may be achieved by subjecting ciphertext data to the reverse order of the steps used for encryption.

As explained above, an external user may have direct control over all of the elements of the first kind of challenge vectors (e.g., the IV). In contrast, the external user may only have indirect or no control over the second kind of challenge vectors (e.g., the "M" mask value, or the "S" state value). An attacker may present any number of values of the first kind of challenge vectors to the cryptographic operation, but may encounter limitations as to accessing or modifying the second kind of challenge vectors. Process 600 limits the ability of such an attacker with respect to one or both of these two types of challenge vectors. When applied to the first kind, process 600 may allow a challenge vector of the first kind to be fed into the cryptographic operation only one element at a time (for example, one bit per round). When applied to the second kind, process 600 may scramble a challenge vector of the second kind after every round.

In some embodiments, process 600 may apply to both kinds of challenge vectors, for example, by feeding the input challenge vector provided by an external user one element per round to the cryptographic operation, and by scrambling challenge vectors of the second kind after every round, as a function of all or some of the previously processed elements of the first kind of challenge vectors. As a result, an attacker's ability to obtain multiple side channel measurements from combining the value of a hidden variable with multiple different challenge vectors is curtailed because the attacker may only combine the secret value of the critical variable with at most two different challenge vectors.

Figure 6:
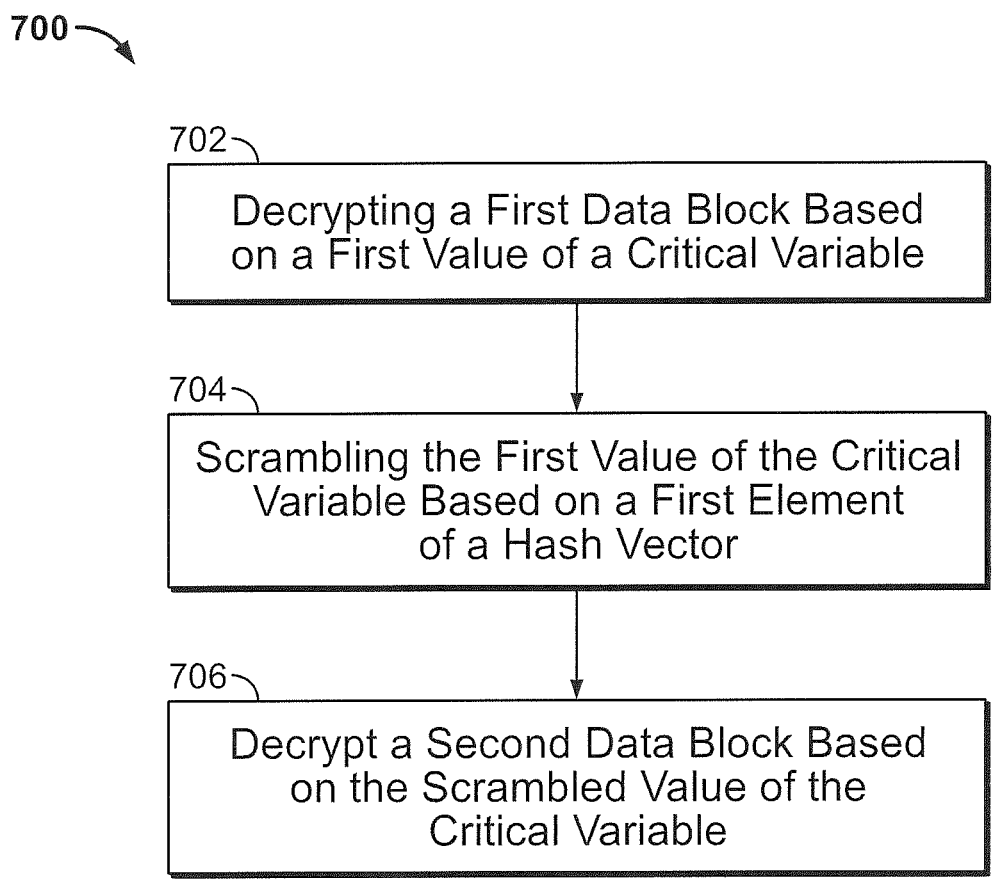
FIG. 6 shows an exemplary flowchart of another process for processing data according to some embodiments.

FIG. 6 shows an exemplary flowchart of a process 700 for processing data according to some embodiments. Process 700 may be implemented in encryption/decryption circuitry similar to encryption system 122 and decoder 102 of FIG. 1. Process 700 may process blocks data, similar to cipher blocks Ci,j of FIG. 4. Process 700 may be performed in a programmable logic device such an FPGA and/or PLD, for encrypting/decrypting data comprising configuration bitstream. Process 700 may also be implemented in any integrated circuit including ASSP, an ASIC, a full-custom chip, and/or a dedicated chip.

At 702, a first data block is decrypted based on a first value of a critical variable used in the cryptographic operation. This may be done using decryption circuitry such as decoder 102 of FIG. 1.

At 704, the first value of the critical variable is scrambled based on a first element of a hash vector to generate a first scrambled value of the critical variable. For example, the value of the critical variable may be conditionally combined with a hidden mask variable, where the hidden mask variable is a function of a prior scrambled value of the critical variable. The hash vector may be similar to the hash value H from FIG. 4. Prior to scrambling the first scrambled value of the critical variable, the hash vector may be updated based on the second data block.

At 706, the second data block is decrypted based on the first scrambled value of the critical variable. After decrypting the second data block, the first scrambled value of the critical variable may be scrambled based on a second element of the hash vector to generate a second scrambled value of the critical variable. Then, a third data block may be decrypted based on the second scrambled value of the critical variable.

It will be understood that the above steps of processes 600 and 700 may be executed or performed in any order or sequence not limited to the order and sequence shown and described in the figure. Also, some of the above steps of processes 600 and 700 may be executed or performed substantially simultaneously where appropriate or in parallel to reduce latency and processing times.

Each of the components of FIGS. 1-4 may include a memory component that may be a read-only memory, random access memory, volatile memory, non-volatile memory, static memory, dynamic memory, flash memory, cache memory, and/or any device that stores digital information. The scrambling operation implementations described herein may belong to a single processing device or a plurality of processing devices. Such an implementation may have a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A method for processing first and second data blocks based on a cryptographic operation, the method comprising:
   decrypting, using decryption circuitry, the first data block based on a value of a critical variable used in the cryptographic operation;
   after decrypting, using the decryption circuitry, the first data block, updating, using scrambling circuitry, a hash vector based on the second data block;
   after updating, using the scrambling circuitry, the hash vector, scrambling, using the scrambling circuitry, the value of the critical variable based on an element of the hash vector to generate a scrambled value of the critical variable; and
   decrypting, using the decryption circuitry, the second data block based on the scrambled value of the critical variable.

2. The method of claim 1, comprising:
   after decrypting, using the decryption circuitry, the second data block, scrambling, using the scrambling circuitry, the scrambled value of the critical variable based on a second element of the hash vector to generate another scrambled value of the critical variable; and
   decrypting, using the decryption circuitry, a third data block based on the other scrambled value of the critical variable.

3. The method of claim 1, wherein the critical variable is an encryption key or an intermediate state corresponding to the cryptographic operation.

4. The method of claim 1, wherein scrambling, using the scrambling circuitry, the value of the critical variable comprises conditionally combining the value of the critical variable with a hidden mask variable, wherein the hidden mask variable is a function of a prior scrambled value of the critical variable.

5. The method of claim 4, wherein the first data block and the second data block being processed comprises a configuration bitstream.

6. A system for processing data based on a cryptographic operation, the circuit comprising:
   decryption circuitry that:
      decrypts a first block of the data based at least in part on a value of a critical variable used in a cryptographic operation; and
      decrypts a second block of data based at least in part on a scrambled value of the critical variable; and
   scrambling circuitry that:
      scrambles the value of the critical variable based at least in part on an element of a hash vector to generate the scrambled value of the critical variable by conditionally combining the value of the critical variable with a hidden mask variable, wherein the hidden mask variable is a function of a prior scrambled value of the critical variable.

7. The system of claim 6, wherein the decryption circuitry comprises a decoder.

8. The system of claim 6, wherein the decryption circuitry decrypts a third data block based at least in part on a second scrambled value of the critical variable.

9. The system of claim 8, wherein the scrambling circuitry that scrambles the scrambled value of the critical variable based on a second element of the hash vector to generate the second scrambled value of the critical variable.

10. The system of claim 6, wherein the critical variable comprises an encryption key or an intermediate state corresponding to the cryptographic operation.

11. The system of claim 6, wherein the system is part of a programmable logic device.

12. A method for processing data based on a cryptographic operation, the method comprising:
   decrypting, using decryption circuitry, a first data block based on a value of a critical variable used in the cryptographic operation;
   decrypting, using the decryption circuitry, a second data block based on a first scrambled value of the critical variable;
   after decrypting, using the decryption circuitry, the second data block, updating, using scrambling circuitry, a hash vector based on the third data block;
   after updating, using the scrambling circuitry, the hash vector, scrambling, using the scrambling circuitry, the value of the critical variable based on an element of the hash vector to generate a second scrambled value of the critical variable; and
   decrypting, using the decryption circuitry, a third data block based on the second scrambled value of the critical variable.

13. The method of claim 12, comprising, after decrypting, using decryption circuitry, the first data block, scrambling, using the scrambling circuitry, the value of the critical variable based on an element of a hash vector to generate the first scrambled value of the critical variable.

14. The method of claim 13, comprising, prior to scrambling, using the scrambling circuitry, the scrambled value of the critical variable, updating the hash vector based on the second data block.

15. The method of claim 13, wherein scrambling, using the scrambling circuitry, the value of the critical variable comprises conditionally combining the value of the critical variable with a hidden mask variable, wherein the hidden mask variable is a function of a prior scrambled value of the critical variable.

16. The method of claim 12, wherein scrambling, using the scrambling circuitry, the value of the critical variable comprises conditionally combining the value of the critical variable with a hidden mask variable, wherein the hidden mask variable is a function of a prior scrambled value of the critical variable.

* * * * *